United States Patent [19]

Braddon et al.

[11] 3,948,801

[45] *Apr. 6, 1976

[54] STABILIZER COMPOSITION OF PHOSPHITE AND LIGNIN

[75] Inventors: David V. Braddon, Charleston Heights; Sten I. Falkehag, Mount Pleasant, both of S.C.

[73] Assignee: Westvaco Corporation, New York, N.Y.

[ * ] Notice: The portion of the term of this patent subsequent to Jan. 29, 1991, has been disclaimed.

[22] Filed: June 13, 1973

[21] Appl. No.: 370,564

Related U.S. Application Data

[62] Division of Ser. No. 288,907, Sept. 14, 1972, Pat. No. 3,822,225.

[52] U.S. Cl. ............ 252/400 A; 252/398; 260/17.5; 260/814
[51] Int. Cl.² C09K 15/32; C08L 97/00; C09K 15/34
[58] Field of Search ............... 252/400 A, 182, 398; 260/17.5

[56] References Cited
UNITED STATES PATENTS

| | | | |
|---|---|---|---|
| 2,976,273 | 3/1961 | Ball | 260/124 |
| 3,201,437 | 8/1965 | Friedman | 260/461 |
| 3,325,427 | 6/1967 | Doughty | 260/17.5 |
| 3,352,700 | 11/1967 | Biskup | 106/123 |
| 3,493,637 | 2/1970 | Coupland | 252/400 A |
| 3,629,141 | 12/1971 | Lecher | 252/400 A |
| 3,629,199 | 12/1971 | Petersen | 260/53 R |
| 3,789,043 | 1/1974 | Falkehag | 260/17.5 |

OTHER PUBLICATIONS

"Encyclopedia of Chemical Technology" 2nd. Ed. 1967, Vol. 12, pp. 362 and 379.
Hine, "Physical Organic Chemistry", McGraw Hill 2nd. Ed. 1962, p. 161.

*Primary Examiner*—Benjamin R. Padgett
*Assistant Examiner*—Donald P. Walsh
*Attorney, Agent, or Firm*—Richard L. Schmalz; Ernest B. Lipscomb, III

[57] ABSTRACT

Stabilizing compositions comprising at least one triaryl phosphite, trialkyl phosphite or mixtures thereof and at least one modified lignin, the weight ratio of the phosphite to modified lignin is from 97/3 to 10/90. The modified lignins are produced by heat treating lignins in the presence of a nucleophile, such that a portion of the original guaiacyl structures are converted to catechols via a demethylation reaction. Elastomers may be protected against atmospheric degradation by the addition thereto of 0.01 to 5.0 parts by weight, preferably 0.25 to 2.0 parts, per 100 parts of elastomer of the stabilizing composition.

2 Claims, No Drawings

1

STABILIZER COMPOSITION OF PHOSPHITE AND LIGNIN

This is a division of application Ser. No. 288,907, filed on Sept. 14, 1972, now U.S. Pat. No. 3,822,225, which issued on July 2, 1974.

BACKGROUND OF THE INVENTION

1. Field of the Invention

This invention relates to stabilizing compositions, elastomers containing such compositions and methods for stabilizing the elastomers. More particularly, this invention relates to compositions for stabilizing elastomers against degradation comprising synergistic mixtures of triaryl, trialkyl phosphites and mixtures thereof, and a nucleophile, heat-treated technical lignins.

2. The Prior Art

Most organic polymeric materials are prone to atmospheric degradation during manufacture, processing, storage and in service. Such polymers include natural and synthetic elastomers as well as plastics, and particularly those polymers which contain processing or catalytic residues therein and which are subject to rapid degradation in physical properties upon use or exposure to heat, light, or atmospheric oxidants. The rate of degradation depends primarily on the composition of the polymer and the conditions of exposure to oxygen, ozone, heat, and light. These adverse effects may be greatly retarded in most materials by the use of stabilizers and antioxidants. Stabilizers and antioxidants then are substances that retard the degradative effect of oxidation and thereby extend the polymer's useful temperature range and service life when added in low concentrations. For the purpose of this specification the terms "stabilizer" and "antioxidant" will, for the sake of simplicity, by referred to interchangeably. The concentration employed depends on the structure, processing conditions, impurities and end use of the polymer. It is common practice to include in polymers, such as elastomers, small amounts of from about 0.01 to 5.0 percent by weight of an antioxidant.

J. R. Sheldon "Rubber Chemistry and Technology", Vol. 45, No. 2, Apr. 15, 1972, pages (356–380) reviews the mechanisms of oxidation and antioxidation. Antioxidants act by inhibiting the formation of free radicals in the initiation step or by interrupting the propagation cycle. The formation of free radicals may be prevented by light absorbers, metal deactivators or peroxide decomposers. Materials that interrupt the propagation cycle are called free radical scavengers or inhibitors. The mechanisms by which the stabilizers and combination of stabilizer used in this invention perform are directly related to the free radical chain reaction described in the Sheldon reference. Murray and Watson "India Rubber World", Vol. 118, August 1948, pages (667–669) teach that unoxidized soda pulp lignin is a stabilizer for styrene-butadiene rubber (SBR). However, such lignin is not presently used as a stabilizer.

The preparation of triaryl and trialkyl phosphites and their use alone as rubber stabilizers is well known having been described in various forms in a number of patents including U.S. Pat. No. 2,419,354 to Howland et al. and U.S. Pat. No. 2,733,226 to Hunter. More exotic substituted triaryl phosphite esters to stabilize rubber compounds are disclosed in U.S. Pat. No. 3,112,286 to Morris et al.

In addition to the use of lignin alone as a stabilizer and the use of phosphites alone as stabilizer described above, blends of phosphites in combination with certain phenolic-type materials are described in U.S. Pat. No. 3,115,465 to Orloff et al., who teaches inhibiting oxidative deterioration of hydrocarbon fuels, oil, etc., with a mixture of soluble phosphite esters and methylene bis-phenol. Another patent, U.S. Pat. No. 3,535,277 to Miller et al., disclosed blends of an alkyl substituted aryl phosphites and certain phenols that provide stabilization properties for polymers.

G. Scott (*Atmospheric oxidation and Antioxidants*, Elsevier, 1965, p. 203) discusses synergism. Scott states: "although synergism exists if the overall effect of (a mixture of) two antioxidants is better than that which would be expected on the basis of a summation of the effects of each component alone, in practice the term is frequently used . . . to describe an effect which is better than the more powerful antioxidant at the same overall conventration. For convenience, then the latter effect will be referred to as practical synergism . . ."

Combinations that exhibit practical synergism are the subject of this invention. Therefore, it is the general object of this invention to provide synergestic compositions which are highly effective as stabilizers of elastomers against atmospheric degradation. Another object of this invention is to provide elastomers that have been stabilized against degradation. Still another object of this invention is to provide a method of stabilizing elastomers. An even further object of this invention is to accomplish the above objects with an additive composition comprising triaryl phosphites or trialkyl phosphites, and mixtures thereof and a nucleophile, heat-treated technical lignin that exhibits a synergistic effect against oxidative degradation.

Other objects, features and advantages of this invention will become evident from the following detailed description of the invention.

SUMMARY OF THE INVENTION

It has been found that the above objects of this invention are accomplished by providing, as new compositions of matter, elastomers tending to deteriorate in the presence of air, oxygen or ozone, stabilized by a synergistic composition consisting of a mixture of a triaryl or trialkyl phosphite and a nucleophile, heat-treated technical lignin, referred to herein as "NHT" lignin, in a weight ratio of from 97/3 to 10/90. The NHT lignins are those materials that have a portion of their original guaicyl structures demethylated and contain more than 0.35 catechol groups per 1000 grams of NHT lignin. The addition to an elastomer of 0.01 parts to 5.00, preferably 0.25 to 2.0, parts by weight per 100 parts of elastomer of said synergestic stabilizer composition has been found to lessen degradation.

DETAILED DESCRIPTION OF THE INVENTION

As was discussed above, technical lignins themselves are known in the prior art as a rubber stabilizers. Technical lignins are those materials isolated from a pulping process such as the soda, sulfite or kraft processes. However, the materials for use in the stabilizers in this invention are, in fact, not technical lignins at all, but are derived from technical lignins. The NHT lignins used in the stabilizers of this invention are made from technical lignins from hard or soft woods that have been heat-treated in the presence of a nucleophile.

Such treatment effects certain condensation reactions and cleavage reactions within the lignin molecules that impart increased stabilizer or antioxidant effectiveness. One cleavage reaction in particular can be used to monitor the progress of the treatment and this is the demethylation of guaicyl and cyringyl structures to form catechols. For the purpose of this specification, "NHT lignins" shall mean materials that have a portion of their original guaicyl structure demethylated and contain at least 0.35 moles of catechol per 1000 grams of NHT lignin. Lignins conventionally recovered from pulping liquors are high molecular weight polymeric materials and although there are some catechol structures in conventionally recovered lignins the amount is relatively small. It is preferably that the NHT lignins used as stabilizers have a catechol content of 1.0 per 1000 grams of material. Further, the NHT lignins contain less than 10% by weight of aromatic dimers and trimers. Nucleophiles such as those listed by Hine (*Physical Organic Chemistry*, McGraw-Hill, 1962 p. 161) may be employed. In particular, hydroxide, thiosulfate, cyanide and sulfide are used.

NHT lignins may be obtained by a variety of treatments such as the high temperature treatment set forth in U.S. Pat. No. 2,976,273 to Ball and Pueschel. In the Ball et al patent residual kraft black liquor is heated at a temperature between 200°C. and 350°C. in this process the nucleophiles naturally occur in the black liquors. Another process for making NHT lignins is set forth in U.S. Pat. No. 3,802,815 to J. B. Doughty which sets forth a low temperature process by reacting technical lignin at a temperature between 140°C. and 200°C. for several hours with hydroxide serving as the nucleophile. It should be pointed out that the NHT lignins themselves act as stabilizers against elastomer degradation as disclosed in co-pending application Ser. No. 268,593, filed July 3, 1972.

The phosphites contemplated for use in this invention include triaryl phosphites, and trialkyl phosphites, and mixtures thereof.

The triaryl phosphites and substituted triaryl phosphites include, for example, triphenyl phosphite, tricresyl phosphite, trixylyl phosphite, monophenyl dicresyl phosphite and tri-(nonyl-phenyl) phosphite. Other examples of triaryl phosphites include tri-(p-octyl-phenyl) phosphite, tri(p-decyl-phenyl) phosphite, tri(p-undecyl-phenyl) phosphite, tri(p-dodecyl phenyl) phosphite, tri(p-tridecyl-phenyl) phosphite, tri(p-tetradecyl-phenyl) phosphite, tri(p-pentadecyl-phenyl) phosphite, tri(p-hexadecyl-phenyl) phosphite, tri(p-heptadecyl-phenyl) phosphite, tri(p-octadecyl-phenyl) phosphite, tri-(p-eicosyl-phenyl) phosphite, p-octyl-phenyl di(p-nonyl-phenyl) phosphite, p-nonyl-phenyl di(p-octyl-phenyl) phosphite, p-dodecyl-phenyl di(p-octyl-phenyl) phosphite, tris(di-octyl-phenyl) phosphite and tris and (di-nonyl-phenyl) phosphite. The preferred triaryl phosphite for use in the compositions of this invention is tris-(nonylphenyl) phosphite, as it has been found that an extremely high degree of synergism is obtained by its use.

Among the trialkyl phosphites contemplated for use in this invention include, but are not limited to, trimethyl phosphite, triethyl phosphite, tripropyl phosphite, tri-isopropyl phosphite and tributyl phosphite. The higher trialkyl phosphites are preferred over the lower trialkyl phosphites, such as trimethyl phosphite and triethyl phosphite, because the lower trialkyl phosphites are highly volatile and odorous.

Also mixed aryl-alkyl phosphites, such as diphenyl-butyl phosphite, may be used. Mixtures of triaryl phosphites and trialkyl phosphites may also be used. It is thus remarkable that when these materials are combined with the NHT lignin described herein such powerful synergistic effects are achieved.

The triaryl, trialkyl phosphite/NHT lignin mixtures for use in the process of this invention protect elastomers against degradation at various stages of manufacture and processing. It has been found that a triaryl or trialkyl phosphite/NHT lignin mixture in a weight ratio of 97/3 to 10/90 is an effective stabilizer to protect elastomers against atmospheric degradation. It is believed that the stabilizer composition comprising a synergistic mixture of triaryl phosphites, trialkyl phosphite or mixtures thereof act as a peroxide decomposer in combination with NHT lignin which acts primarily as a free radical scavenger. The trialkyl, triaryl or tri(aryl alkyl) phosphite/NHT lignin mixture may be added to the elastomer while the elastomer is in latex or emulsion form, suspension form, dispersion form or solution form. The form in which the phosphite/NHT lignin mixture is added to the elastomer latices, suspensions, etc., will depend on such factors as the solubility of the components and whether they are liquids or solids. The stabilizer composition may be added directly as an emulsion with the NHT lignin in solution serving also to emulsify the phosphite. Of course, the results would also occur if the NHT-lignin and phosphite components were added separately. The amounts of the phosphite/NHT lignin mixture that are used as a stabilizer are from about 0.01 to about 5.0 parts, and preferably from about 0.25 to about 2.00 parts, by weight per 100 parts of elastomer. The amount of phosphite/NHT lignin mixture necessary for a given degree of stabilization will vary depending on the type of elastomer being stabilized. For example, in raw synthetic rubber the level of stabilizer addition is preferably 0.7 to 1.7 parts by weight per 100 parts of rubber. The phosphite/NHT lignin may also be added to dry polymers using any of the conventional dry mixing means such as an open mill, an extruder or an internal mixer such as a Banbury mixer. The stabilizer present in the raw rubber is believed to continue to be an effective antioxidant after vulcanization step. The phosphite/NHT lignin mixtures are especially useful as stabilizers in synthetic raw rubbers.

Billmeyer (*Textbook of Polymer Science*, Interscience, 1956, p. 180) defines elastomers as high polymers that are above their glass transition temperature, amorphous in their stable (unstressed) state, and contain a network of crosslinks. As employed in this application, the term "elastomer" applies to natural and synthetic rubber. Synthetic rubber includes polymers and copolymers that possess the properties listed by Billmeyer and are prepared from various conjugated dienes and mono olefins. Representative e examples of the synthetic rubbers used in the practice of this invention are homopolymers of a conguated diene such as 1,3-butadiene, isoprene or chloroprene and copolymers of a conjugated diene such as isoprene or butadiene with at least one copolymerizable ethylenically unsaturated monomer such as isobutylene, styrene, acrylonitrile, unsaturated carboxylic acids, or other substituted vinyl derivatives. Typical commercial examples of the synthetic rubbers used in the practice of this invention are styrene-butadiene, acrylonitrile, or unsaturated carboxylic acids. The practice of this invention is found most beneficial when applied to the stabilization of copolymers of butadiene and styrene.

The common test used by the rubber industry to screen stabilizers is to determine the Mooney viscosity as a function of time of accelerated heat aging. The Mooney instrument is essentially a powerful viscometer. A knurled disc is compressed between two pieces of rubber and the disc is rotated. The force necessary to rotate the disc is a measure of the viscosity of the rubber. A high value indicates high viscosity or low plasticity. Stabilizers act to retard any change in Mooney viscosity. The procedure for determining Mooney viscosity may be found in A.S.T.M. designation D-1646-63.

The practice of this invention may clearly be seen in the following examples.

EXAMPLES 1

This example illustrates the percent change in Mooney viscosity as a function of aging time for a series of tris(p-nonylphenyl) phosphite/NHT lignin mixtures. The NHT lignin was the product of a nucleophile, heat-treated material from softwood black liquor according to the process set forth in U.S. Pat. No. 2,976,273 to Ball et al, heated at 300°C. for 7.5 minutes and containing 3.1 catechal groups per 1000 grams of NHT lignin. To determine stabilizing effectiveness, the mixtures were added as an emulsion to styrene-butadiene (SBR 1502) latex at 1.5 parts of total stabilizer per hundred parts of elastomer. This was coagulated with salt acid and the crum freeze dried. The results are shown in the table below.

| % tris(p-nonyl phenyl) phosphite | % NHT Lignin | % Change in Mooney Viscosity Days Aged at 100°C. | |
|---|---|---|---|
| | | 5 | 10 |
| 0   | 100 | 25 | 58 |
| 13  | 87  | 23 | 43 |
| 20  | 80  | 19 | 35 |
| 33  | 67  | 20 | 44 |
| 50  | 50  | 13 | 35 |
| 60  | 40  | 2  | 28 |
| 67  | 33  | 0  | 26 |
| 73  | 27  | 8  | 31 |
| 80  | 20  | 0  | 58 |
| 87  | 13  | 8  | 28 |
| 97  | 3   | 6  | 56 |
| 99  | 1   | 20 | 78 |
| 100 | 0   | 31 | 75 |

The results show that NHT lignin/phosphite mixtures containing from 3 to about 90 percent NHT lignin were superior stabilizers. Clearly phosphite/NHT lignin mixtures have improved synergestic stabilizer activity. The optimum ratio for NHT lignin/phosphite mixtures varies widely and must be determined for each individual case.

EXAMPLE 2

To determine stabilizing effectiveness of various stabilizers to those of this invention, 1.5 parts of the NHT lignin per hundred parts of elastomer were added as an alkaline slurry to a styrene-butadiene (SBR 1502) latex. The mixture was coagulated with salt acid and the crumb freeze dried. The table is a summary of the percent change in Mooney viscosity as a function of aging time for selected stabilizer in a styrene-butadiene (SBR 1502) latex.

| PERCENT CHANGE IN MOONEY VISCOSITY | | | |
|---|---|---|---|
| | Days Aged at 100°C. | | |
| Stabilizer added at 1.5 PHR | 5 | 10 | 15 |
| None | 178 | — | — |
| Tris(p-nonylphenyl) phosphite | 31 | 75 | 98 |
| REAX 27[a] | 69 | — | — |
| Geltrol[b] | −4 | 6 | 19 |
| NHT Lignin[c] | 25 | 58 | — |
| NHT lignin/phosphite (33/67) | 0 | 26 | 93 |

Notes:
[a]Kraft technical lignin by Westvaco Corporation.
[b]A phenol/phosphite combination produced by B. F. Goodrich.
[c]Made according to Example 1.

Unstabilized SBR 1502 hardened rapidly showing a 178% increase in Mooney viscosity after five days of accelerated heat aging. The stabilizers all showed embrittlement after 15 days aging time at 100°C., except that of the invention.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A stabilizing composition which consists of, (a) at least one phosphite from the group consisting of triaryl phosphites, trialkyl phosphites, tri(aryl-alkyl) phosphites, and mixtures thereof, and (b) a technical lignin which has been heated in an aqueous solution containing a nucleophile and having at least 0.35 catechol groups per 1000 grams of said lignin, wherein the weight ratio of the phosphite to the said lignin is from 97/3 to 10/90.

2. The composition of claim 1 wherein the phosphite is tris-nonyl phenyl phosphite.

\* \* \* \* \*